C. E. OLIVER.
MEANS FOR CALCINING HYDROMAGNESITE.
APPLICATION FILED NOV. 14, 1921.
1,436,520.
Patented Nov. 21, 1922.
2 SHEETS—SHEET 1.
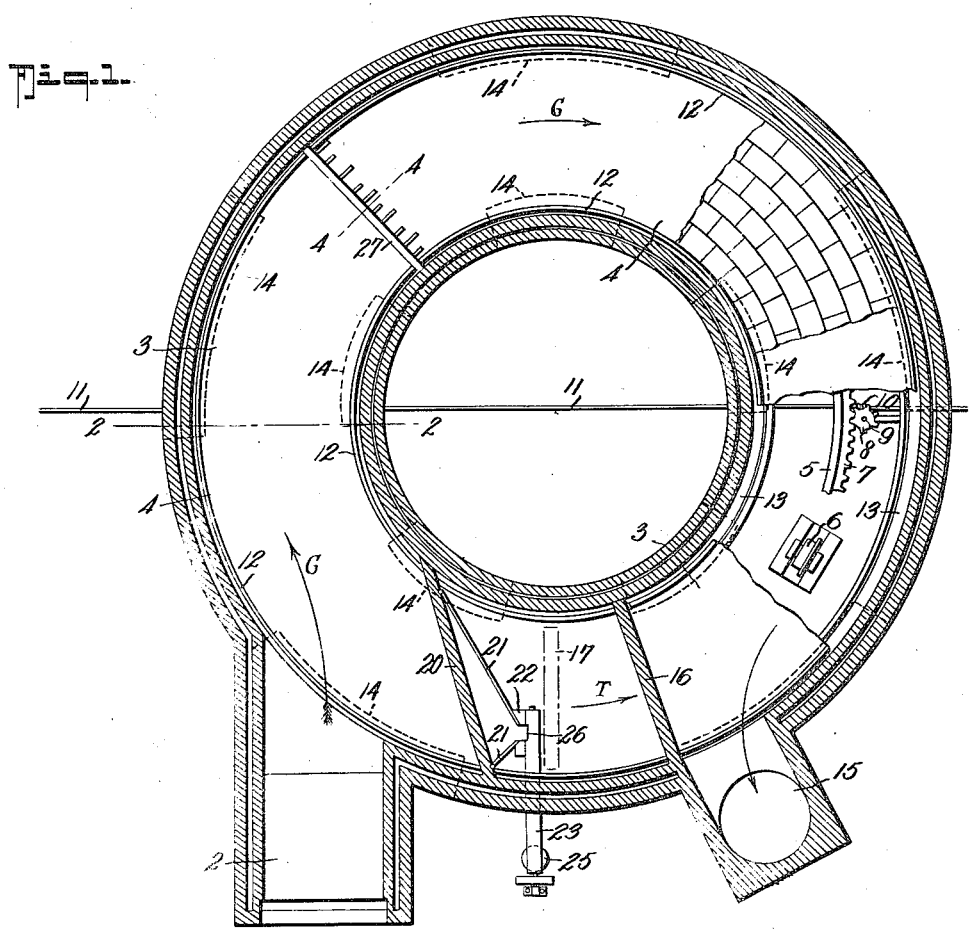
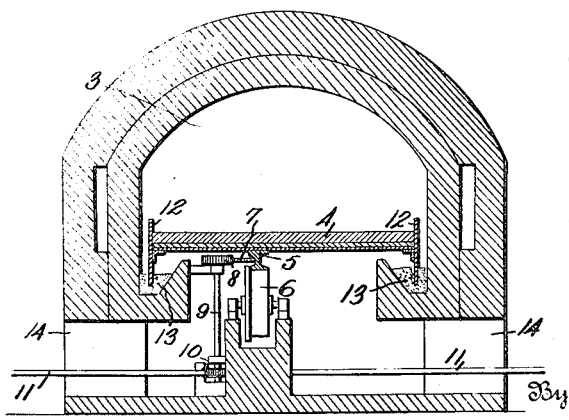
Inventor
Charles E. Oliver
By Fred G. Dieterich
Attorneys C. E. OLIVER.
MEANS FOR CALCINING HYDROMAGNESITE.
APPLICATION FILED NOV. 14, 1921.
1,436,520.
Patented Nov. 21, 1922.
2 SHEETS—SHEET 2.
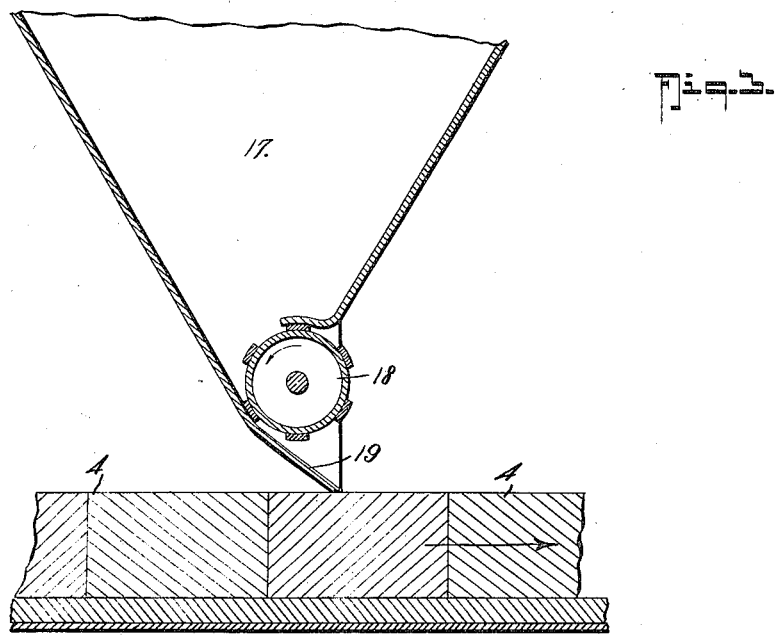
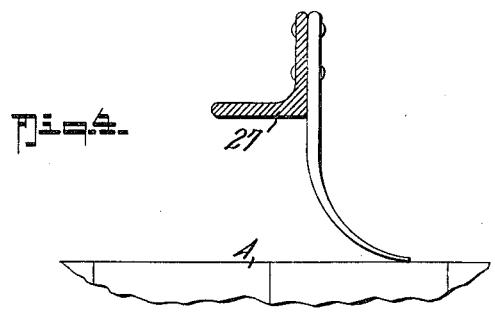
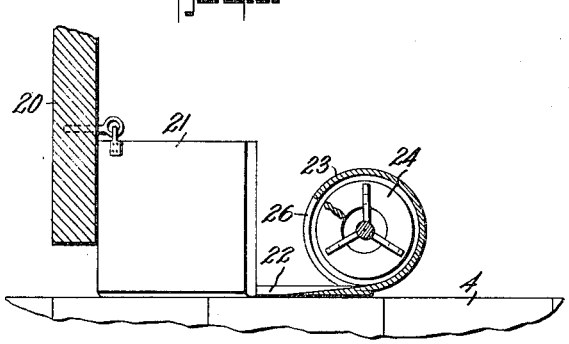
Inventor
Charles E. Oliver
By Fred G. Dieterich & Co
Attorneys Patented Nov. 21, 1922.

1,436,520

UNITED STATES PATENT OFFICE.

CHARLES E. OLIVER, OF VANCOUVER, BRITISH COLUMBIA, CANADA.

MEANS FOR CALCINING HYDROMAGNESITE.

Application filed November 14, 1921. Serial No. 515,119.

*To all whom it may concern:*

Be it known that I, CHARLES E. OLIVER, citizen of the Dominion of Canada, residing at Vancouver, in the Province of British Columbia, Canada, have invented certain new and useful Improvements in Means for Calcining Hydromagnesite, of which the following is a specification.

This invention relates to a furnace which has been particularly designed for calcining hydromagnesite. Ordinary methods of calcination are not available with this material owing to its extreme lightness and the microscopic fineness of its particles, and further to the fact that the carbon dioxide is driven off with considerable energy during the earlier stages of calcination, and carries with it the finely divided particles of calcined magnesite.

As the carbon dioxide gas will readily recombine with the magnesite while it is cooling, it is also necessary to prevent the carbon dioxide as driven off, coming in contact with the calcined material.

These several difficulties are overcome in the device, which is the subject of this application, by slowly passing the hydromagnesite continuously in a thinly distributed layer, along a relatively elongated flue, through which gases from a furnace are passed which will heat the walls and roof of the flue to a sufficiently high temperature, to effect calcination of the material, the hot gases moving in a direction opposite to that of the material being calcined, that they may carry the evolved carbon dioxide away from the material from which it has been discharged.

The invention also includes several features advantageous to effective and economic calcining of this material to which attention will be drawn in the following specification, reference being made to the drawings by which it is accompanied, in which:

Fig. 1 is a sectional plan of the calcining furnace on the line 1—1 in Fig. 2 with portions removed showing the construction of the platform and the supports beneath.

Fig. 2 is a cross section on the line 2—2 in Fig. 1.

Fig. 3 is an enlarged detail of the hopper feed of the hydromagnesite to the kiln, and Fig. 4 is a detail to an enlarged scale of the scrabbling tines by which the material on revolving platforms of the flue is turned over after initial calcination has been effected.

Fig. 5 is a detail view of a portion of my apparatus hereinafter described.

In these drawings 2 represents the furnace from which the heat for calcination is derived. This furnace delivers its gases into an annular flue 3, the walls and roof of which are lined with refractory material that will stand the dull red heat of calcination and are supported on piers 14. The bottom of this flue 3 is formed by a flat annular conveyor platform 4 of sheet metal having a circular supporting rail 5 secured to its underside about its mid area, which rail rests on roller wheels 6 rotatably mounted in bearings at intervals apart around the circle of the flue.

Secured to the outer and inner edges of the platform 4 to project downward from it, are circular curtain plates 12, the lower edges of which run in circular troughs 13 around the outer and inner side walls of the flue 3, which troughs are filled with a loose material such as sand or calcined magnesite, which effectually prevents any draught out or in from or to the flue in which the calcination is going on.

On the upper surface of the plate conveyor 4 a layer of bricks or tiles of refractory material is laid on a layer of magnesite to prevent transmission of the heat of the bricks to the metal platform and to the space beneath it.

This conveyor platform 4 is rotated from a horizontal shaft 11 which extends diametrically across beneath the platform and drives by means of worm gear 10 a vertical shaft 9 on each opposite side. On the upper end of each vertical shaft is a pinion 8, the teeth of which mesh with those of a circular rack 7 secured to the supporting rail 5 of the platform.

The furnace gases as delivered from the furnace 2 into the flue 3, travel around it in the direction of the arrows G to the curtain wall 16, which is carried across the flue clear of the upper surface of the conveyor platform 4 and diverts the gases into an uptake 15 which delivers them either to the atmosphere or to a chamber for such treatment as may be necessary for the recovery of the carbon dioxide as a by-product.

Between the furnace connection and the curtain wall 16 a feed hopper 17 delivers the hydromagnesite in a uniformly distributed layer across the width of the revolving platform 4. This uniform distribution is effected by a mechanically rotated feed roller 18 having flat ridges extending lengthwise along it, which roller is mounted in the lower part of the hopper to move that side downward which is toward the back edge of the hopper. It thus withdraws measured quantities of the material from the hopper and deposits such upon a delivery plate 19 angularly sloping downward to the platform 4 toward the direction of its rotation. The material is thus continuously fed in uniformly measured quantities from the hopper and is quietly and without disturbance delivered on the moving platform 4.

Immediately beyond the connection of the furnace 2 to the flue 3 in the direction of rotation, that is, between that connection and the delivery plate 19 of the feed, is located a provision for continually removing the calcined material from the platform 4. This removing means comprises a curtain wall 20 sloping angularly forward across the upper side of the platform 4, from the inner to the outer circle thereof, from which wall is suspended to rest with their weight on the platform, scraper plates 21, the free ends of which plates rest on a horizontally disposed thin edged plate 22 secured to the underside of an aperture 26 in a tube 23, in which tube is rotatably mounted a spiral conveyor 24. The outer end of the tube 23 and its conveyor project outside the wall of the flue and deliver into a down-take pipe 25, from the lower end of which the light calcined material is withdrawn and delivered by a draught of injected air into a storage chamber.

The scraper plates 21 sweep the table clear of the calcined material and by the angle at which they are set deliver it to the spiral conveyor 24 for removal from the flue.

In operation the heat from the furnace 2 is delivered into the flue 3 at a temperature sufficient to effect the calcining of the material, and passes around it in the direction of the arrows G until it encounters the curtain wall 16 and passes to the uptake 15. The platform conveyor 4 on which the hydromagnesite to be calcined is spread in an evenly distributed layer, is rotated in a direction opposite to that of the heated flue gases, as indicated by the arrows T.

The length of the flue and the rate of movement of the conveyor platform 4 are carefully designed to expose the deposited layer of the hydromagnesite to the heat of the flue for a sufficient time to effect complete calcination.

By the manner of delivery of the material on to the platform it is in a loose condition that will be readily acted on by the heat to which it is gradually subjected, for it will be noted that the platform revolves from the feed 17 in the direction of the arrow T, and passing under the curtain wall 16 is first exposed to the moderate heat adjacent the uptake 15 and therefrom passes slowly to the hotter part where the gases are delivered into the flue from the furnace 2.

After the greater part of the moisture and carbon dioxide has been delivered from the magnesite and the violent evolution of the gas has ceased, the material may be scrabbled or turned over on the platform without risk of the fine material being carried away with the evolved gases, and such scrabbling will enable the heat to more effectively penetrate the material and effect its complete calcination.

This scrabbling is effected by a bar 27 extending across the table 4 from which bar tines project downward and backward opposite to the direction of movement to penetrate and loosen the material as it passes under it.

Attention may be drawn to the fact that the calcination of the material is not effected by direct application of the hot flue gases to it, but by the radiant heat from the roof and walls of the flue heated by the furnace gases.

Attention is also drawn to the fact that the weight of the evolved carbon dioxide being in excess of the flue gases, the gases as evolved will lie in a more or less clearly defined stratum over the material, so that the material is not directly exposed to the flue gases until it comes close to the furnace delivery where the evolved gases are materially less in quantity. The greater specific weight of the carbon dioxide proves advantageous in the recovery of it as it will naturally fall to the lower part of the flue chamber and may be separately withdrawn in a comparatively pure state for further treatment.

The advantages of this method of calcining this material are that the operation is a continuous one: that the hydromagnesite is gradually exposed to the heat action by which the evolution of the gases is conducted under conditions that effectively pevent the exceptionally light and finely divided microscopic particles being carried away with the evolved gas.

It also enables the surface of the material to be scrabbled to enable the calcining heat to reach the underlying parts and complete the operation of calcination after violent evolution of the gas has ceased.

It is also worthy of note that the operative mechanism by which the platform 4 is revolved is heat insulated from the flue, and owing to the flue being supported on piers atmospheric air is freely admitted to where the operative mechanism is located, Having now particularly described my invention, I hereby declare that what I claim as new and desire to be protected in by Letters Patent, is:

1. A calcining means comprising an elongated flue from a furnace to an uptake, a platform movable along the bottom of the flue in a direction opposite to that of the furnace gases, means adjacent the uptake for feeding an evenly distributed layer of the material to be calcined on the surface of the platform, and means adjacent the furnace connection for removing the entire layer of the calcined material from the platform and from the flue.

2. A calcining means comprising an elongated flue from a furnace to an uptake, the side walls and roof of said flue being supported on piers with the underside open to the atmosphere, an endless platform movable along the lower part of the flue in a direction opposite to that of the furnace gases and forming a bottom for the flue, means for sealing the space above the platform from the space beneath, means adjacent the uptake for feeding an evenly distributed layer of the material to be calcined on the surface of the platform, and means adjacent the furnace connection for removing the entire layer from the platform and from the flue.

3. A calcining means comprising an annular flue, a partition wall across the flue, a furnace delivering into the flue on one side of the cross partition, an uptake from the flue on the other side of the cross partition, an annular platform movable along the bottom of the flue beneath the partition wall, means for rotating that platform in a direction opposite to that of the furnace gases, means adjacent the uptake for feeding an evenly distributed layer of the material to be calcined on the surface of the platform, and means adjacent the furnace connection for removing the entire layer of the calcined material from the platform and from the flue.

4. A calcining means comprising an annular flue the side walls and roof of which are supported on piers, an annular movable platform forming the bottom of the flue, means for sealing the space above the platform from the space below, a partition wall across the flue to adjacent the level of the platform, a furnace delivering into the flue on one side of the cross partition, an uptake delivering from the flue on the other side of the partition, means for rotating the platform in a direction opposite to that of the furnace gases, means adjacent the uptake for feeding an evenly distributed layer of the material to be calcined on the surface of the platform, and means adjacent the furnace connection to the flue for removing the entire layer of the calcined material from the platform and from the flue.

5. A calcining means comprising an annular flue the side walls and roof of which are supported on piers, an annular movable platform forming the bottom of the flue the edges of which platform are downwardly turned to project into annular grooves formed in the inner and outer walls of the flue in which grooves is a sealing material, a partition wall across the flue to adjacent the level of the platform, a furnace delivering into the flue on one side of the cross partition, an uptake delivering from the flue on the other side of the partition, means for slowly rotating the platform in a direction opposite to that of the furnace gases, means adjacent the uptake for feeding an evenly distributed layer of the material to be calcined on the surface of the platform, means adjacent the furnace connection to the flue for removing the entire layer of the calcined material from the platform, and means for delivering it from the flue.

6. A calcining means comprising an annular flue, two cross partition walls across the flue adjacent one another, a furnace delivering into the flue on one side of the cross partitions, an uptake from the flue on the other side of the cross partitions, an annular platform movable along the bottom of the flue beneath the partition walls, means for rotating that platform in a direction opposite to that of the furnace gases, means between the cross partitions for feeding an evenly distributed layer of the material to be calcined on the surface of the platform, means between the cross partitions for collecting the entire layer of the calcined material on the platform, and means for delivering the collected material from the platform and from the flue.

In testimony whereof I affix my signature.

CHARLES E. OLIVER.